United States Patent
Hopper et al.

(10) Patent No.: US 9,400,754 B2
(45) Date of Patent: Jul. 26, 2016

(54) ASYNCHRONOUS SWAP MECHANISM AND PAGE EVICTION FROM MEMORY

(71) Applicant: International Business Machines Corporation, Armonk, NY (US)

(72) Inventors: Jenifer Hopper, Austin, TX (US); Mark A. Peloquin, Austin, TX (US); Steven L. Pratt, Leander, TX (US); Karl M. Rister, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 14/134,365

(22) Filed: Dec. 19, 2013

(65) Prior Publication Data

US 2015/0178222 A1 Jun. 25, 2015

(51) Int. Cl.
*G06F 12/12* (2016.01)
*G06F 3/06* (2006.01)

(52) U.S. Cl.
CPC .............. *G06F 12/121* (2013.01); *G06F 3/065* (2013.01); *G06F 3/067* (2013.01); *G06F 3/0619* (2013.01)

(58) Field of Classification Search
CPC ....... G06F 12/12; G06F 12/121; G06F 3/065; G06F 3/0619; G06F 3/067
See application file for complete search history.

(56) References Cited

U.S. PATENT DOCUMENTS

| 6,115,787 A * | 9/2000 | Obara ................. G06F 12/0871 710/68 |
| 2009/0172337 A1 | 7/2009 | Van Riel et al. |
| 2010/0312970 A1* | 12/2010 | Bell ...................... G06F 12/121 711/135 |
| 2012/0272010 A1 | 10/2012 | Larkby-Lahet et al. |

OTHER PUBLICATIONS

Hsien-Hsin, Lee Gary Tyson, Matthew Farrens, "Eager Writeback—a Technique for Improving Bandwidth Utilization", University of Michigan, Jun. 14, 1999.*

* cited by examiner

Primary Examiner — Matthew Bradley
Assistant Examiner — Rocio Del Mar Perez-Velez
(74) Attorney, Agent, or Firm — Lieberman & Brandsdorfer, LLC

(57) ABSTRACT

Embodiments of the invention relate to mitigating page eviction from cache memory. Pages of data in the cache are compressed, and are periodically swapped to a physical storage device to create space in the cache for additional pages. To avoid the impact of eviction latencies, an asynchronous thread scanning process scans the cache for any pages that are not committed to the storage device, decompresses a selected one of the pages, and asynchronously writes the decompressed page copy to the physical storage device. The compressed copy of the selected page remains in the cache during the asynchronous write with an indicator for the page set to convey that a replica of the page has been written to physical storage, allowing for efficient eviction from the in-memory pool at a later time.

20 Claims, 4 Drawing Sheets

ASYNCHRONOUS SWAP MECHANISM AND PAGE EVICTION FROM MEMORY

BACKGROUND

The present invention relates to one or more page(s) of data and the relationship between an in-memory pool and a physical storage device with respect to the page(s) of data. More specifically, the invention relates to asynchronously swapping compressed page(s) from the in-memory pool to the physical device.

Caching is a common technique used to speed memory processes. Cache memory is smaller, faster and typically more expensive than physical storage. When a processing unit requests data that resides in main memory, the processing system transmits the requested data to the processor, and also may store the data in a cache memory. When the processor issues a subsequent request for the same data, the processing system first checks cache memory. If requested data resides in the cache, the system gets a cache "hit" and delivers the data to the processor from the cache. If the data is not resident in the cache, a cache "miss" occurs, and the system retrieves the data from main memory. Frequently utilized data thereby is retrieved more rapidly than less frequently requested data, and overall data access latency, i.e. time between a request for data and delivery of the data, is reduced.

It is recognized that cache memory has limited capacity. One solution to optimize the pages is to compress the pages in the cache in order to retain more pages in the limited capacity of the cache. However, this merely defers swapping pages from cache to physical storage.

BRIEF SUMMARY

The invention comprises a method, computer program product, and system for asynchronous swapping one or more pages in cache memory to a physical storage device.

A method, computer program product, and system are provided for managing a cache memory device. The cache memory is scanned to ascertain one or more pages of cache memory that are not committed to a physical storage device, and to select one of the uncommitted page for swapping. The selected page, which is present in the cache in a compressed format, is decompressed, and then asynchronously written to the physical storage device. At the same time, the compressed copy of the selected page remains in the cache memory with an indicator set on the page as evidence that a replica of the page has been written to the physical storage device.

Other features and advantages of this invention will become apparent from the following detailed description of the presently preferred embodiment(s) of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Reference is made to a memory device and to one or more physical storage devices and page memory. The memory device refers to a random access memory (RAM) based memory pool. The physical storage device(s) refers to persistent storage. A page of memory is a fixed length contiguous block of virtual memory recognized by the operating system. Data that is in RAM can be manipulated. At the same time, space in the RAM is limited. To effectively manage the capacity of RAM, the act of paging is employed to copy a page of data from RAM to a physical storage device, or the inverse. In one embodiment, paging is also referred to as swapping. Accordingly, data can be copied between RAM and the physical storage device.

The act of swapping pertains to copying portions of data into RAM as they are needed. Swapping occurs when there is little or no space remaining in RAM for data. In one embodiment, when data is copied into RAM, an equal size of the data is copied out to the persistent storage to make space in the RAM.

Recent developments support compressing pages of memory and storing the compressed page(s) in a RAM based memory pool. An offset is reserved on the swap device in case the page cannot be stored in the memory pool. If the page is compressed and stored in the pool, the offset remains empty unless the page is later written to the swap device. Swapping compressed pages between RAM and the physical storage device(s) is challenging. Each compressed page has to be decompressed and written to the previously reserved slot on the physical device. The process of compressing and decompressing pages results in higher latencies.

Figure 1:
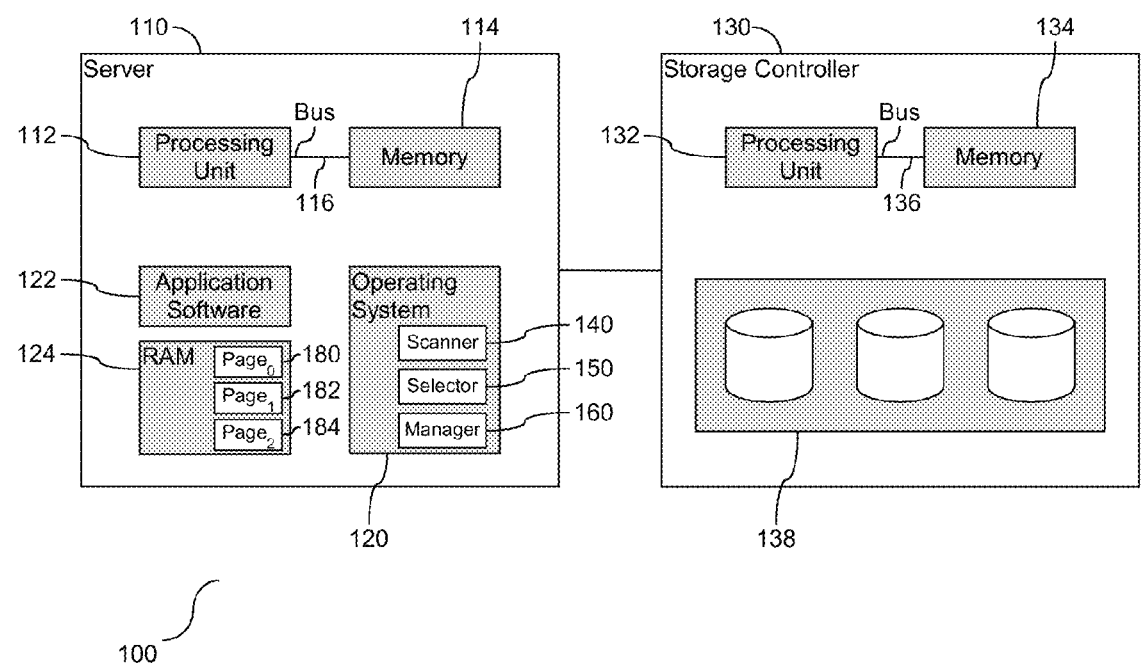
FIG. 1 depicts a block diagram illustrating tools embedded in a computer system to support the functionality of the asynchronous replication from the in-memory pool to the physical storage device.

To address the issues of swapping with respect to compression, an asynchronous background tool is implemented to decompress and swap pages to physical storage while leaving a copy of the compressed page(s) in RAM. FIG. 1 is a block diagram (100) illustrating tools (140), (150), and (160) embedded in a computer system to support the functionality of the asynchronous replication from the in-memory pool, hereinafter referred to as a pool, to the physical storage. There are three primary components shown herein, including a scanner (140), a selector (150), and a manager (160). In a different embodiment, the tools function as application software (122).

A computer system, which in one embodiment may be a server, (110) is provided with a processing unit (112) operatively coupled to memory (114) across a bus (116). The server (110) is shown with an operating system (120) in communication with application software (122), e.g. tools, also referred to herein as a user application. The operating system (120) reads and writes data to the in-memory pool (124). One or more physical storage devices are provided in communication with the server (110). As shown, herein by way of example, a storage controller (130) may be provided with multiple physical storage devices (138). The controller (130) is shown with a processing unit (132) operatively coupled to memory (134) across a bus (136), and in communication with the storage devices (136). In one embodiment, the storage controller (130) is in local communication with the server (110) and functions to receive pages of data copied from the pool (124). Similarly, in one embodiment, the storage controller (130) may be in remote communication with the server (110), and may also be in communication with one or more additional storage devices in a shared pool of resources. Regardless of the local or remote communication between the server (110) and the storage controller (130), the pool (124) reflects pages of memory in random access memory, and the storage controller (130) supports persistent storage in a physical device.

As shown, the pool (124) is provided with multiple pages of memory (180), (182), and (184). Although only three pages of memory are shown, this quantity is not limiting and is provided for descriptive purposes. The operating system (120) is provided with tools to support the asynchronous implementation for swapping pages of memory from the pool to the physical devices. The tools include a scanner (140), a selector (150), and a manager (160). The scanner (140) functions to scan the pool (124) for one or pages of memory (180), (182), and (184) that are not committed to the physical storage devices (138). The scanner (140) may be in the form of an application or in one embodiment an independent process in the operating system (120). The selector (150) functions to select a copy of one or more non-committed pages from the pool (124). The selector (150) may be in the form of an application or in one embodiment an independent process in the operating system (120). Accordingly, the scanner (140) ascertains the status of the pages, and the selector (150) selects pages based on the status.

The manager (160) is provided in communication with the selector (150). The manager (160) functions to asynchronously write a decompressed page copy to the physical storage device. A compressed copy of the selected page remains in the pool while a replica of the page is written to the physical storage device. More specifically, the manager (160) decompresses the selected page, and writes the decompressed page to the physical storage device. As explained herein, an asynchronous thread or background application performs the replication. In one embodiment, the pool may reach or come near capacity and space may need to be made in the pool to receive new pages of data. To make space in the pool, the manager (160) scans the pool for at least one page that has a replica indicator set in response to the memory device reaching capacity. The page with the indicator set may be removed from the pool, with a copy of the page already present on the physical storage. In one embodiment, the replica indicator may be in the form of a flag to indicate a copy of the page is on the physical storage device. Accordingly, the tools support the asynchronous replication of pages of memory to enable and support management of the pool.

As identified above, the tools (140), (150), and (160) are shown residing in operating system software local to the server (110). In one embodiment, the tools may reside individually or collectively as an application in memory (114) or as a hardware tools or an application external to the memory (114). In another embodiment, the tools may be implemented as a combination of hardware and software. In the case of a shared pool of resources, the tools may be collectively or individually distributed across the shared pool or computer resources and function as a unit to support asynchronous processing and support of pages of memory. Accordingly, the tools may be implemented as a software tool, hardware tool, or a combination of software and hardware.

Figure 2:
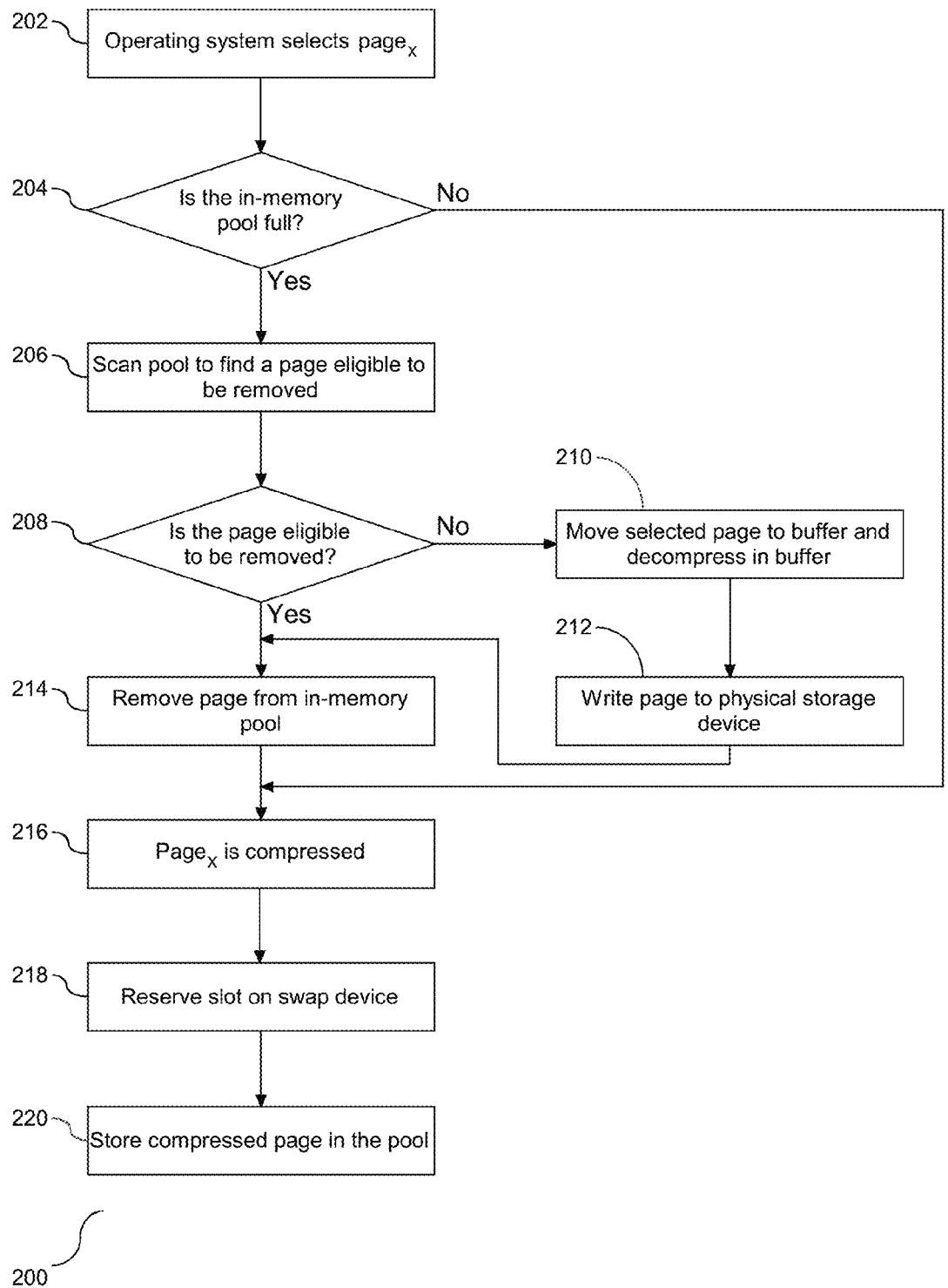
FIG. 2 depicts a flow chart illustrating a process for swapping compressed pages with the functionality of the asynchronous background tool.

To further illustrate, and as shown herein, FIG. 2 is a flow chart (200) illustrating a process for swapping compressed pages with the functionality of the asynchronous background tool. Initially, the operating system selects page$_x$ to be stored in the in-memory pool (202). Page$_x$ represents any operating system selected page coming into the pool. It is then determined if the RAM, also referred to herein as an in-memory pool, is full (204). A positive response to the determination at step (204) is an indication that one or more pages must be swapped to the physical storage device, also referred to herein as the device. In one embodiment with a partially filled RAM, multiple pages may present as compressed pages in the RAM as well as on physical storage. The memory pool is scanned to ascertain if at least one page in the pool is eligible to be removed from the pool because a replica resides on physical storage (206). The scan at step (206) references a page that is not selected page$_x$, e.g. the page is a different page that is already in the pool. In one embodiment, each eligible page will have an indicator to identify eligibility. For example, in one embodiment, each eligible page will have a bit set in the header thereof. Similarly, in one embodiment, at step (206) the operating system may request that a specific quantity of pages be removed. In another embodiment, multiple pages may be eligible for swapping, and the operating system may select pages with the set indicator that are also identified as the least recently used (LRU). Accordingly, prior to swapping, the pool is scanning to find one or more pages eligible to be swapped to the physical device(s).

Following step (206) it is determined if the page(s) identified is/are eligible for removal from the in-memory pools (208). If the response at step (208) shows that the page is not present on the physical device, the selected page(s) is moved to a buffer and decompressed in the buffer (210). Following decompression, the selected page(s) is written to the physical storage device (212), also referred to herein as the paging device, and the page is removed from the pool (214). At the same time, if at step (208) it is determined that the identified page(s) are present on the swap device, the process proceeds to step (214).

If at step (204) it is determined that the pool is not full or following step (214), page$_x$ is compressed (216). In one embodiment, the page selected at step (202) is selected in anticipation of a swap. Following compression of the selected page(s), a slot on the swap device, e.g. physical storage, is reserved for the page (218), and the compressed page, page$_x$, is stored in the pool (220). As shown, one or more pages are compressed and stored in the pool, with reservation of a slot on the swap device in anticipation of swapping. Accordingly, the background operation is an asynchronous procedure that prepares for swapping compressed pages of memory as an eventuality, with the compressed page remaining in the pool prior to the swap.

Figure 3:
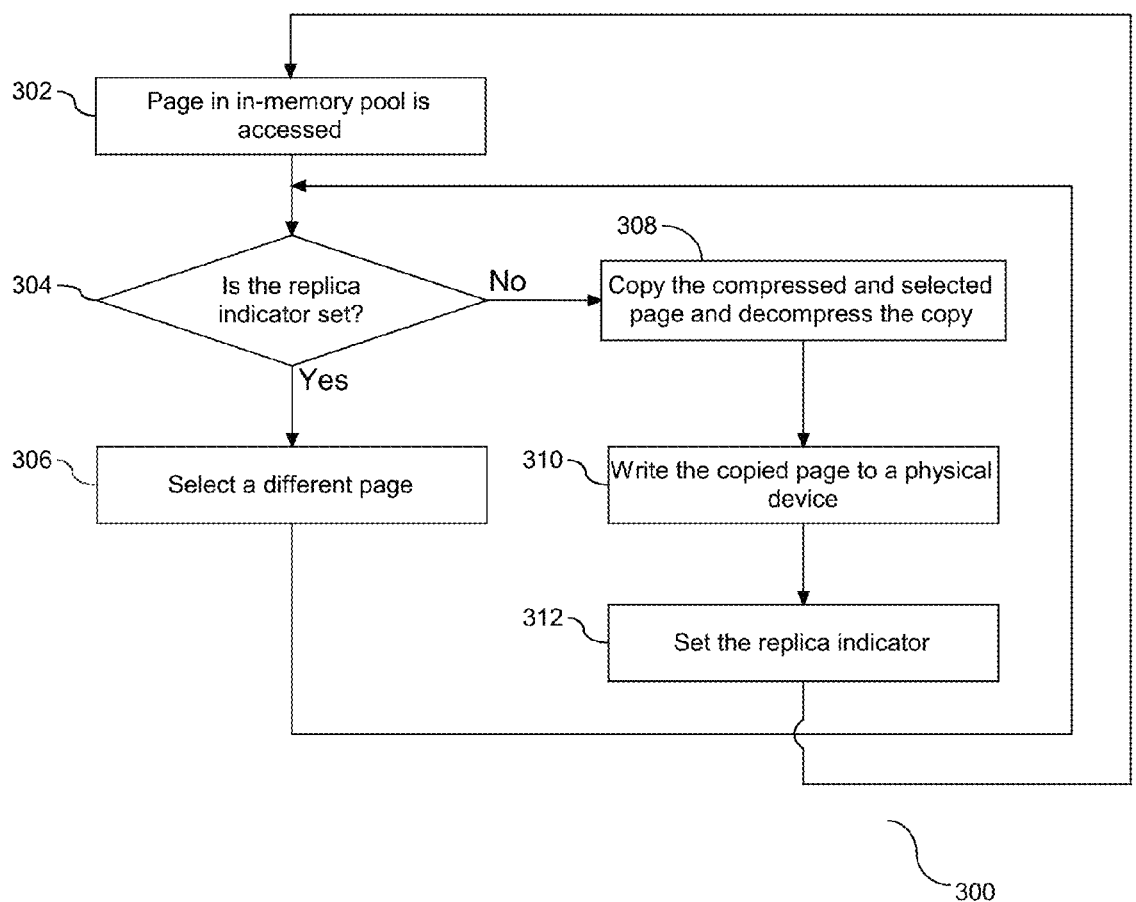
FIG. 3 depicts a flow chart illustrating functionality of the asynchronous background procedure.

The process shown and described in FIG. 2 relates to actions that take place after the pool has been determined to be full. FIG. 3 is a flow chart (300) illustrating the functionality of the asynchronous background procedure. In one embodiment, the background procedure is in the form of a thread that allows a program to execute sequential actions. When a page in the in-memory pool is accessed (302), it is determined if the replica indicator is set (304). In one embodiment, the indicator is in the form of a commit bit set in the header of the page. A positive response to the determination at step (304) is followed by selection of a different page (306) and a return to step (304). However, a negative response to the determination at step (304) is followed by a copy of the compressed selected page and a decompression of the copy of the selected page (308). After the copied page is decompressed, the copied page is written to a physical device (310), followed by setting the replica indicator of the compressed page in the pool (312). The asynchronous background procedure is continuous. As shown, following the setting of the indicator at step (312), the process returns to step (302) to access a page in the in-memory pool. Accordingly, the background procedure shown herein scans the pool for a page that does not already have an indicator of swapping eligibility present in the page.

As shown and described in FIGS. 2 and 3, a background process or thread asynchronously copies pages from the pool to the physical storage. Pages that are subject to the copying are not removed from the pool. This increases the potential that a new request will find the page in the compressed pool since it was not removed during the copying process. In addition, when space is required in the pool, any page that has been copied to the physical device may be deleted without additional action required enabling efficient freeing of memory in the pool. Accordingly, the background process or thread enables the pool to efficiently operate, either by utilizing a requested page in the pool or making space available by removing a page that has already been copied to the physical device.

The server described above in FIG. 1 has been labeled with tools, including a scanner, a selector, and a manager. The tools may be implemented in programmable hardware devices such as field programmable gate arrays, programmable array logic, programmable logic devices, or the like. The tool may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of the tool need not be physically located together, but may comprise disparate instructions stored in different locations which, when joined logically together, comprise the tool and achieve the stated purpose of the tool.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single data set, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 4:
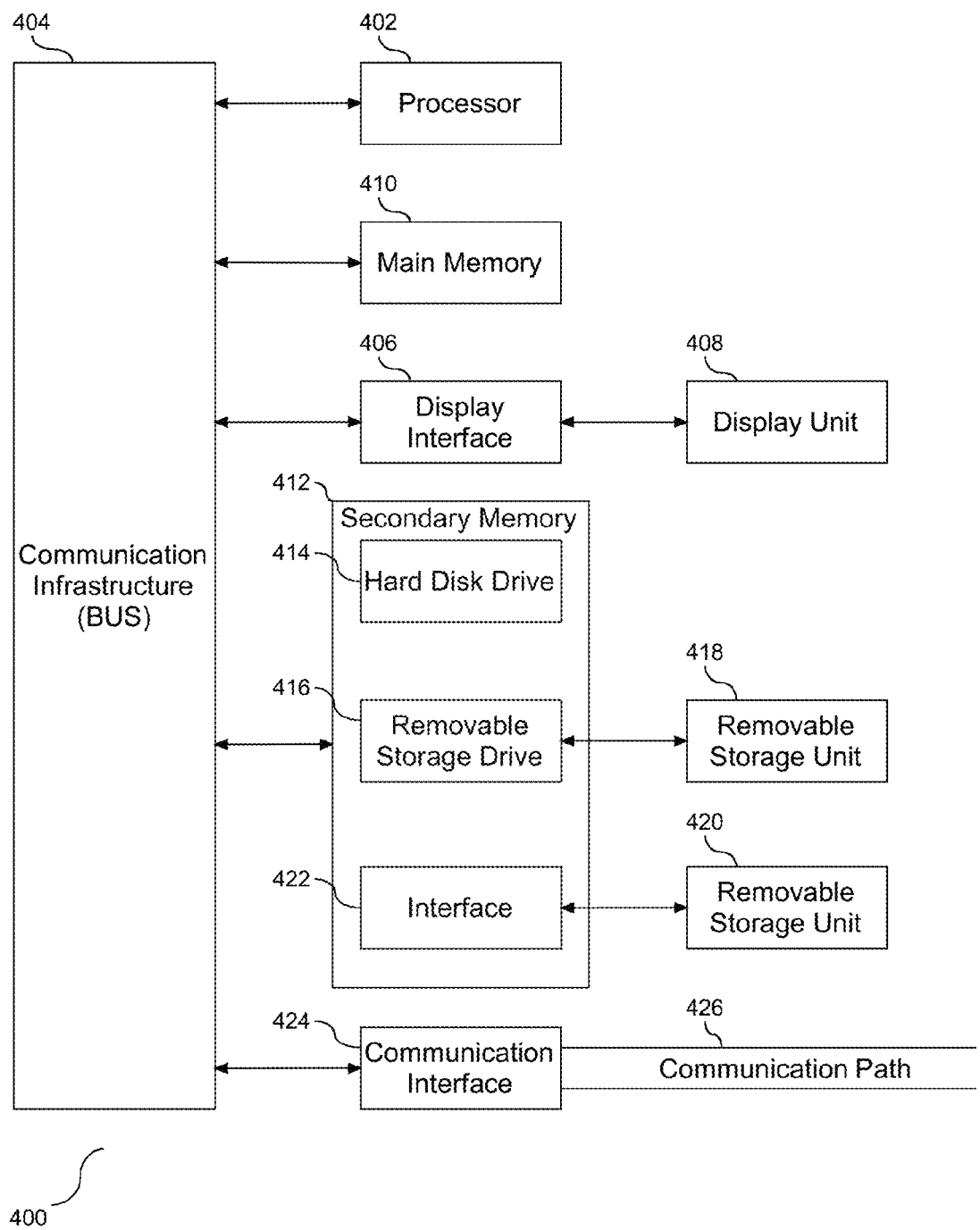
FIG. 4 depicts a block diagram of a computing environment according to an embodiment of the present invention.

Referring now to the block diagram of FIG. 4, additional details are now described with respect to implementing an embodiment of the present invention. The computer system includes one or more processors, such as a processor (402). The processor (402) is connected to a communication infrastructure (404) (e.g., a communications bus, cross-over bar, or network).

The computer system can include a display interface (406) that forwards graphics, text, and other data from the communication infrastructure (404) (or from a frame buffer not shown) for display on a display unit (408). The computer system also includes a main memory (410), preferably random access memory (RAM), and may also include a secondary memory (412). The secondary memory (412) may include, for example, a hard disk drive (414) and/or a removable storage drive (416), representing, for example, a floppy disk drive, a magnetic tape drive, or an optical disk drive. The removable storage drive (416) reads from and/or writes to a removable storage unit (418) in a manner well known to those having ordinary skill in the art. Removable storage unit (418) represents, for example, a floppy disk, a compact disc, a magnetic tape, or an optical disk, etc., which is read by and written to by removable storage drive (416). As will be appreciated, the removable storage unit (418) includes a computer readable medium having stored therein computer software and/or data.

In alternative embodiments, the secondary memory (412) may include other similar means for allowing computer programs or other instructions to be loaded into the computer system. Such means may include, for example, a removable storage unit (420) and an interface (422). Examples of such means may include a program package and package interface (such as that found in video game devices), a removable memory chip (such as an EPROM, or PROM) and associated socket, and other removable storage units (420) and interfaces (422) which allow software and data to be transferred from the removable storage unit (420) to the computer system.

The computer system may also include a communications interface (424). Communications interface (424) allows software and data to be transferred between the computer system and external devices. Examples of communications interface (424) may include a modem, a network interface (such as an Ethernet card), a communications port, or a PCMCIA slot and card, etc. Software and data transferred via communications interface (424) is in the form of signals which may be, for example, electronic, electromagnetic, optical, or other signals capable of being received by communications interface (424). These signals are provided to communications interface (424) via a communications path (i.e., channel) (426). This communications path (426) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (410) and secondary memory (412), removable storage drive (416), and a hard disk installed in hard disk drive (414).

Computer programs (also called computer control logic) are stored in main memory (410) and/or secondary memory (412). Computer programs may also be received via a communication interface (424). Such computer programs, when run, enable the computer system to perform the features of the present invention as discussed herein. In particular, the computer programs, when run, enable the processor (402) to perform the features of the computer system. Accordingly, such computer programs represent controllers of the computer system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block(s).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the asynchronous writing of pages compressed page to physical storage enables a seamless swapping of pages.

ALTERNATIVE EMBODIMENT

It will be appreciated that, although specific embodiments of the invention have been described herein for purposes of illustration, various modifications may be made without departing from the spirit and scope of the invention. In particular, accordingly, the scope of protection of this invention is limited only by the following claims and their equivalents.

We claim:

1. A method comprising:
    scanning a random access memory device for one or more compressed pages of memory uncommitted to a physical storage device;
    selecting at least one uncommitted page from the random access memory device;
    creating a replica of the selected uncommitted page, including copying the selected uncommitted page, and decompressing the copy; and
    asynchronously writing the replica to the physical storage device, and setting a replica indicator on the selected uncommitted page while the selected uncommitted page remains in the random access memory device.

2. The method of claim 1, wherein the selected uncommitted page remains in the random access memory device during the asynchronous writing of the replica to the physical storage device.

3. The method of claim 2, further comprising determining that the random access memory device exceeds a capacity in response to selecting a new page of memory for storage in the random access memory device, and scanning the memory device for at least one eligible page.

4. The method of claim 3, wherein determining that the random access memory device is unable to store the new page comprises determining that the random access memory device has reached capacity.

5. The method of claim 3, further comprising removing the at least one eligible page from the random access memory device, and storing the new page in the random access memory device.

6. The method of claim 5, wherein the new page is uncompressed, and further comprising:
    compressing the new page prior to the storage in the random access memory device;
    reserving a slot for the new page on the physical storage device.
    determining that at least one selected eligible page is uncommitted; and
    writing a replica of each uncommitted selected eligible page to the physical storage device prior to the removal from the random access memory device.

7. The method of claim 5, further comprising determining that at least one of the scanned eligible pages has a replica indicator, wherein the removed eligible page is an eligible page determined to have a replica indicator.

8. The method of claim 1, wherein the replica indicator is a flag indicating that the replica is on the physical storage device.

9. A computer program product for managing a random access memory device, the computer program product comprising a computer readable storage device having program code embodied therewith, the program code executable by a processor to:
    scan the random access memory device for one or more compressed pages of memory uncommitted to a physical storage device;
    select at least one uncommitted page from the random access memory device;
    create a replica of the selected uncommitted page, including program code to copy the selected uncommitted page, and decompress the copy;
    asynchronously write the replica to the physical storage device, and set a replica indicator on the selected uncommitted page while the selected uncommitted page remains in the random access memory device.

10. The computer program product of claim 9, wherein the selected uncommitted page remains in the random access memory device during the asynchronous writing of the replica to the physical storage device.

11. The computer program product of claim 10, further comprising program code to determine that the random access memory device exceeds a capacity in response to a selection of a new page of memory for storage in the random access memory device, and scan the memory device for at least one eligible page.

12. The computer program product of claim 11, further comprising program code to remove the at least one eligible page from the memory device, and store the new page in the random access memory device.

13. The computer program product of claim 12, wherein the new page is uncompressed, and further comprising program code to:
    compress the new page prior to the storage in the random access memory device;
    reserve a slot for the new page on the physical storage device;
    determine that at least one selected eligible page is uncommitted;
    write a replica of each uncommitted selected eligible page to the physical storage device prior to the removal from the random access memory device.

14. The system of claim 12, wherein the new page is uncompressed, and wherein the swap further comprises:
    the manager to compress the first page prior to storage in the random access memory device, and reserve a slot for the new page on the physical storage device;

the scanner to determine that at least one selected eligible page is uncommitted; and the manager to write a replica of each uncommitted selected eligible page to the physical storage device prior to the removal from the random access memory device.

15. The computer program product of claim 9, wherein the replica indicator is a flag indicating that the replica is on the physical storage device.

16. A computer system comprising:

a processing unit operatively coupled to a random access memory device;

a physical storage device in communication with the random access memory device; and tools in communication with the processing unit to manage the random access memory device, including:

a scanner to scan the random access memory device for one or more compressed pages of memory uncommitted to the physical storage device;

a selector in communication with the scanner, the selector to select at least one uncommitted page from the memory device;

a manager in communication with the selector, the manager to:

create a replica of the selected uncommitted page, including the manager to copy the selected uncommitted page, and decompress the copy; and asynchronously write the replica to the physical storage device, and set a replica indicator on the selected uncommitted page while the selected page remains in the random access memory device.

17. The system of claim 16, wherein the selected uncommitted page remains in the random access memory device during the asynchronous writing of the replica to the physical storage device.

18. The system of claim 17, further comprising the manager to determine that the random access memory device exceeds a capacity in response to a selection of a new page of memory for storage in the random access memory device, and the scanner scan the random access memory device for at least one eligible page.

19. The system of claim 18, further comprising the manager to remove the at least one eligible page from the random access memory device, and store the new page in the random access memory device.

20. The system of claim 16, wherein the replica indicator is a flag to indicate that the replica is on the physical storage device.

* * * * *